(12) United States Patent
Ito et al.

(10) Patent No.: US 11,657,549 B2
(45) Date of Patent: May 23, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Tomoyuki Ito, Kanagawa (JP); Hirokazu Mukai, Kanagawa (JP); Masato Ando, Kanagawa (JP); Minoru Kasama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 282 days.

(21) Appl. No.: 16/903,383

(22) Filed: Jun. 17, 2020

(65) Prior Publication Data

US 2021/0118208 A1    Apr. 22, 2021

(30) Foreign Application Priority Data

Oct. 17, 2019    (JP) .............................. JP2019-190067

(51) Int. Cl.
*G06T 11/20*    (2006.01)
*G09G 5/37*    (2006.01)

(52) U.S. Cl.
CPC .............. *G06T 11/206* (2013.01); *G09G 5/37* (2013.01)

(58) Field of Classification Search
None
See application file for complete search history.

(56) References Cited

U.S. PATENT DOCUMENTS

| | | | |
|---|---|---|---|
| 9,077,623 B2* | 7/2015 | Narayanan | H04L 41/22 |
| 11,295,062 B1* | 4/2022 | Fanberg | G06F 40/174 |
| 2003/0069900 A1* | 4/2003 | Hind | G06Q 10/107 |
| 2009/0249213 A1* | 10/2009 | Murase | G06F 3/04817 |
| | | | 715/734 |
| 2011/0055279 A1* | 3/2011 | Terasaka | G06F 16/289 |
| | | | 707/E17.055 |
| 2011/0148880 A1* | 6/2011 | De Peuter | H04L 41/12 |
| | | | 345/440 |
| 2011/0249002 A1* | 10/2011 | Duplessis | G06T 11/206 |
| | | | 345/440 |
| 2011/0283239 A1* | 11/2011 | Krishnan | G06Q 10/103 |
| | | | 714/37 |
| 2013/0307854 A1* | 11/2013 | Nora | H04L 41/22 |
| | | | 345/440 |
| 2015/0339835 A1* | 11/2015 | Mohr | G06T 11/206 |
| | | | 345/440 |

(Continued)

FOREIGN PATENT DOCUMENTS

JP    2016081185    5/2016

*Primary Examiner* — Sultana M Zalalee
(74) *Attorney, Agent, or Firm* — JCIPRNET

(57) ABSTRACT

An information processing apparatus includes a display control section that displays a relation diagram expressing logical relationships between events from an upstream side to a downstream side, displays, in a case where an instruction of folding is performed on a plurality of events selected as folding starting points from among the events, the relation diagram in which events on the downstream side of the plurality of selected events are folded, and displays, in a case where an instruction of expanding is performed on the relation diagram in a folded state, the relation diagram expanded in a state before the folding.

20 Claims, 10 Drawing Sheets

(56) References Cited

U.S. PATENT DOCUMENTS

2018/0129325 A1\* 5/2018 Shreve .............. G06Q 40/025
2019/0379684 A1\* 12/2019 Brown .............. H04L 63/20
2020/0050648 A1\* 2/2020 Garg ............... G06F 16/904

\* cited by examiner

| BOX ID | POINT ID | EVENT NAME | TYPE | LEVEL NUMBER |
|---|---|---|---|---|
| 100000 | – | WARPING AMOUNT | QUALITY | FIRST LEVEL |
| 110000 | Point 1 | ... | FUNCTION | SECOND LEVEL |
| ... | Point n | ... | ... | ... |

FIG. 8

| FOLDING ID | REGISTRATION DATE AND TIME | USER ID | FOLDING TYPE | POINT ID |
|---|---|---|---|---|
| F001 | ⋮ | U003 | ATTRIBUTE (PAPER RELATION) | Point 2, ⋯ |
| F002 | ⋮ | ⋮ | ATTRIBUTE (THREE LEVELS) | ⋮ |
| ⋮ | ⋮ | ⋮ | ALL | ⋮ |
| ⋮ | ⋮ | ⋮ | INDIVIDUAL | ⋮ |
| ⋮ | ⋮ | ⋮ | ⋮ | ⋮ |

33

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-190067 filed Oct. 17, 2019.

BACKGROUND

(i) Technical Field

The present invention relates to an information processing apparatus and a non-transitory computer readable medium storing a program.

(ii) Related Art

In recent years, an information processing apparatus which facilitates creation of a table related to quality function deployment is proposed (for example, see JP2016-081185A).

An information processing apparatus described in JP2016-081185A connects, in a quality function deployment process, function items having a dependency relationship according to the dependency relationship, creates a relation diagram with attribute information for specifying the process to which the function item belongs for each function item belonging to any one of processes on a system diagram in which a plurality of function items are organized, extracts each function item, the attribute information of the function item, and dependency information of the function item from the relation diagram in a case where the relation diagram is input and stores the attribute information and the dependency information as original information, and sets an axis of a deployment table or a multi-dimensional table to create and output the deployment table or the multi-dimensional table corresponding to the set axis by using the original information.

SUMMARY

In creating a relation diagram expressing a logical relationship between a plurality of events, as the number of events increases, it becomes difficult to find the event of interest.

Aspects of non-limiting embodiments of the present disclosure relate to an information processing apparatus and a non-transitory computer readable medium storing a program that collectively fold a downstream side from a plurality of folding starting points as needed on a relation diagram expressing a logical relationship between a plurality of events.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display control section that displays a relation diagram expressing logical relationships between events from an upstream side to a downstream side, displays, in a case where an instruction of folding is performed on a plurality of events selected as folding starting points from among the events, the relation diagram in which events on the downstream side of the plurality of selected events are folded, and displays, in a case where an instruction of expanding is performed on the relation diagram in a folded state, the relation diagram expanded in a state before the folding.

BRIEF DESCRIPTION OF THE DRAWINGS

Exemplary embodiment(s) of the present invention will be described in detail based on the following figures, wherein:

FIG. 8 is a diagram illustrating an example of folded state registration information;

DETAILED DESCRIPTION

Figure 1:
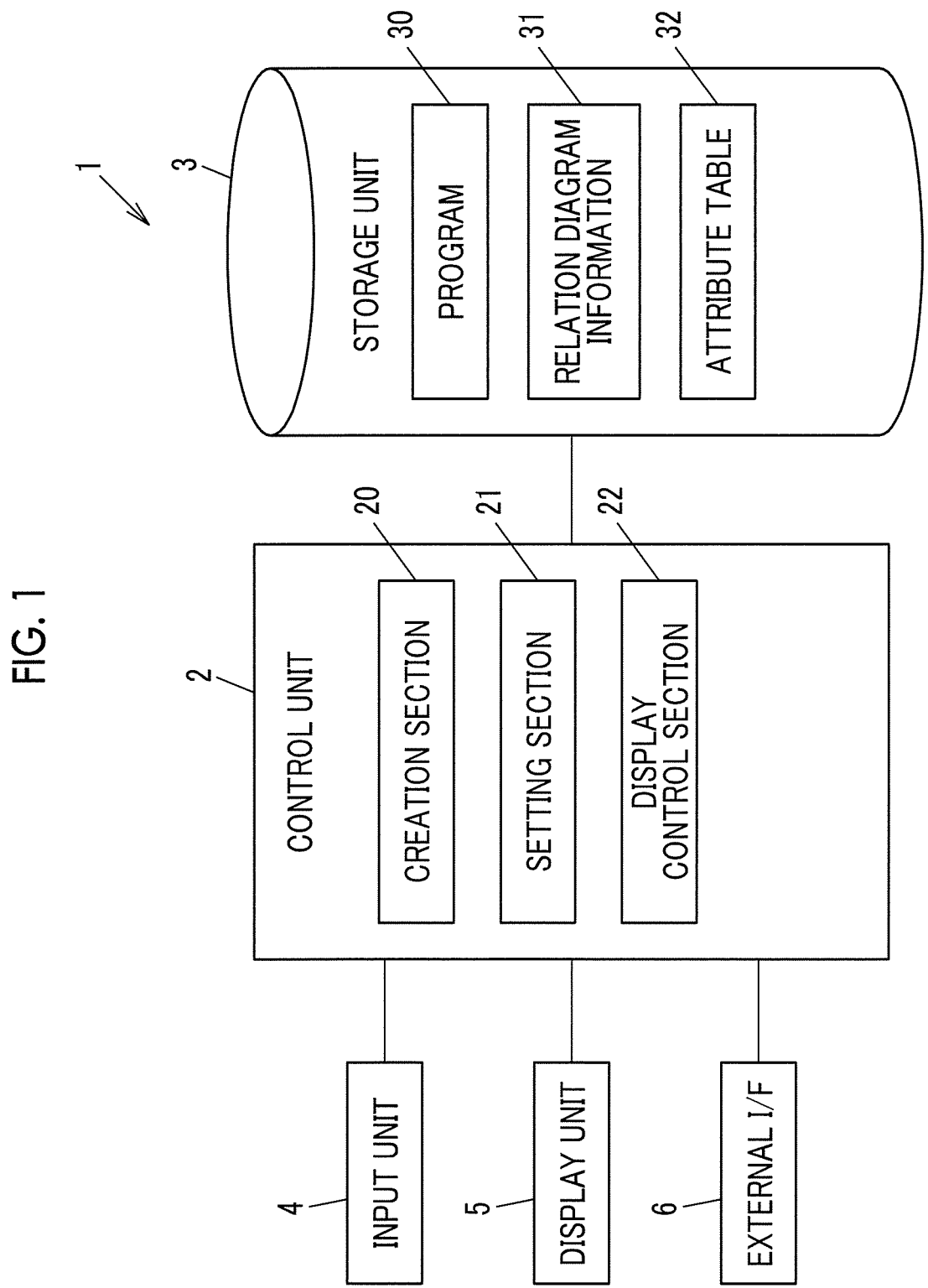
FIG. 1 is a block diagram illustrating a schematic configuration example of an information processing apparatus according to an exemplary embodiment of the invention.

Hereinafter, exemplary embodiments according to the present disclosure will be described with reference to drawings. In each drawing, components having substantially the identical function are denoted by the same reference numerals, and redundant description is not repeated.

SUMMARY OF EXEMPLARY EMBODIMENT

According to the present exemplary embodiment, there is provided an information processing apparatus including: a display control section that displays a relation diagram expressing logical relationships between events from an upstream side to a downstream side, displays, in response to instruction of folding is performed on events serving as a plurality of starting points selected as folding starting points among the plurality of events, the relation diagram in which events on the downstream side from the respective events serving as the corresponding plurality of starting points are folded, and displays, in a case where an instruction of expanding is performed on the relation diagram in a folded state, the relation diagram expanded in a state before the folding.

A logical relationship includes a causal relationship, an equal relationship, an opposition relationship, and the like. The causal relationship refers to a relationship in which a change in a physical quantity defined in one event causes a corresponding change in a physical quantity defined in the other event such as a cause or a factor and a result, a reason and an assertion between events. A relation diagram is a diagram illustrating a logical relationship between a plurality of events.

Exemplary Embodiment

FIG. 1 is a block diagram illustrating a schematic configuration example of an information processing apparatus according to an exemplary embodiment of the invention. An information processing apparatus 1 includes a control unit 2, a storage unit 3, an input unit 4, a display unit 5, and an external interface (I/F) 6.

The control unit 2 is configured to include a processor such as a central processing unit (CPU), an interface, and the like. The processor functions as a creation section 20, a setting section 21, a display control section 22, or the like by executing a program 30 stored in the storage unit 3. Details of each of the sections 20 to 22 will be described below.

Figure 2:
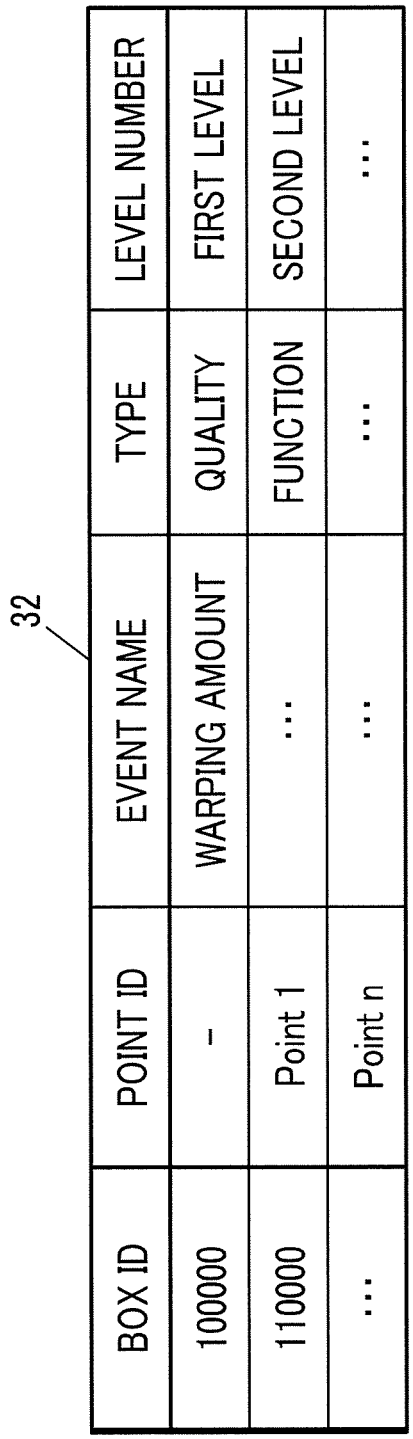
FIG. 2 is a diagram illustrating an example of an attribute table.

The storage unit 3 is configured to include a read only memory (ROM), a random access memory (RAM), a hard disk, and the like, and stores various types of information such as the program 30, relation diagram information 31, and an attribute table 32 (see FIG. 2).

The relation diagram information 31 has, for example, image data and additional data. The image data includes objects such as boxes, connectors, and the like constituting the relation diagram. The additional data refers to data generated on the information processing apparatus 1 side in association with generation of a relation diagram created by an operation of the input unit 4 by a user, and includes, for example, position information of the object in the relation diagram, a box ID for identifying a box, and the like. The box is represented by, for example, a rectangular frame, and a name of an event or the like is input inside. The connector is a line connecting the boxes by a straight line or a curve, for example, and has an arrow at a tip on the connection destination side. The connector may not have the arrow at the tip. The box is an example of an event component. The connector is an example of a connection component.

The input unit 4 is realized by, for example, a keyboard, a mouse, and the like. The display unit 5 is realized by, for example, a liquid crystal display or the like. The external I/F 6 is realized by a network interface card (NIC) or the like, and transmits and receives information to and from an external apparatus such as an external database via a network.

FIG. 2 is a diagram illustrating an example of the attribute table 32. The attribute table 32 records information (hereinafter, referred to as "attribute") attached by the user to a box and a connector, and includes items such as "box ID", "point ID", "event name", "type", "level number", and the like. In the "box ID", a box ID for identifying a box is recorded. In the "point ID", a point ID, for example, Point 1, which indicates a folding starting event designated by the user from candidates of an event set in advance as a folding starting point (hereinafter, also referred to as a "starting event") is recorded. In the "event name", a name of an event is recorded. In the "type", for example, quality, a function, a physical characteristic value, a design parameter, and the like are recorded as a type of the event. In the "level number", a level number is recorded from left to right, such as a first level and a second level. The point ID is an example of first identification information. The event name, the type, and the level number are examples of attribute information.

Figure 3:
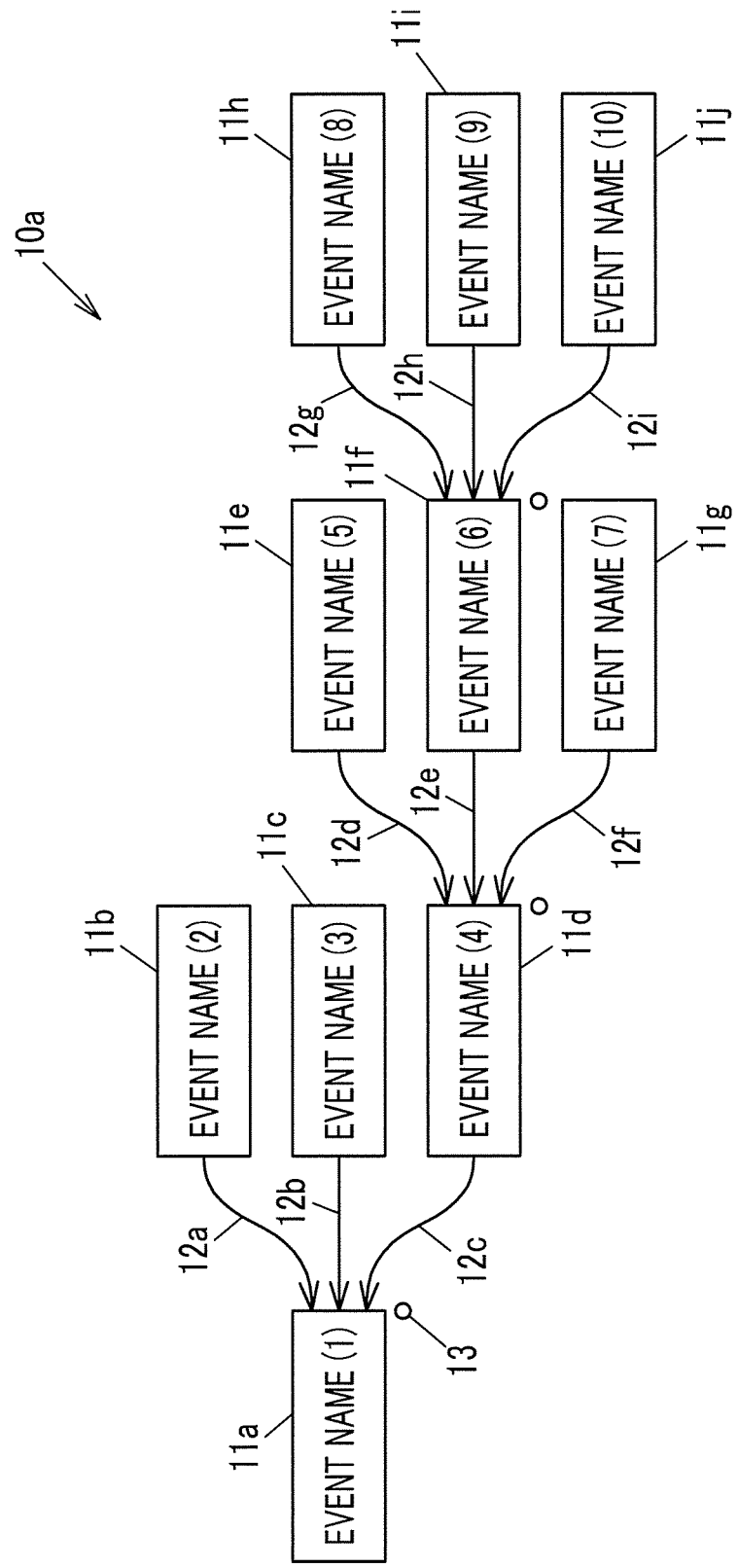
FIG. 3 is a diagram illustrating an example of a relation diagram.

FIG. 3 is a diagram illustrating an example of a basic relation diagram. A relation diagram 10a expresses, for example, a plurality of events in a logical relationship. In the present exemplary embodiment, a causal relationship is illustrated as the logical relationship. The causal relationship includes a cause or a factor and a result, a reason and an assertion, and the like, and in this exemplary embodiment, a causal relationship between the cause or the factor and the result will be described.

The relation diagram 10a is configured to include a plurality of boxes 11a, 11b, 11c, . . . (hereinafter, collectively referred to as "box 11") indicating an event displayed by surrounding an event name such as an event name (1), an event name (2), or the like with a rectangular frame and connectors 12a, 12b, 12c, . . . which connect the boxes 11 with lines (hereinafter, collectively referred to as "connector 12").

There are a case where the boxes 11 are connected by the connector 12, a case where the boxes 11 are connected from one downstream box 11 (hereinafter, also referred to as a connection source) to one upstream box 11 (hereinafter, also referred to as a connection destination), a case where a plurality of boxes 11 as connection sources are connected to one box 11 as a connection destination, and a case where one box 11 as a connection source is connected to a plurality of boxes 11 as connection destinations. In some cases, the box 11 at the lower level is connected to the box 11 in the upper level, or the box 11 at the two or more lower level is connected to the box 11 in the upper level.

In FIG. 3, the connectors 12 indicating the relationship between the boxes 11 are all displayed by the same type of line, but a thickness of the line or the type of the line may be changed in accordance with the relationship between the boxes 11, that is, a strength of the relationship.

Each of the displayed boxes 11 has a plurality of hierarchical structures such as, for example, quality, a function, a physical characteristic value, and a design parameter. The box 11 on the left side in FIG. 2 is also called a parent event (for example, a result), and the box 11 on the right side is also called a child event (for example, a cause or a factor).

A parent event to which a child event is connected on the downstream side is a candidate of a folding starting event. In a case illustrated in FIG. 3, candidates of the starting event are the boxes 11a, 11d, and 11f, and folding buttons 13 of instructing folding are provided in the vicinity of the boxes 11a, 11d, and 11f, for example, in the vicinity of the lower right corner of the frame. The folding button 13 is, for example, white before being selected as the starting event, and changes to, for example, red in a case of being selected as the starting event. In a case where the folding button 13 is operated, the box 11 and the connector 12 on the downstream side are folded and displayed. A folding location can be known not only by a display state of the relation diagram 10a but also by a color of the folding button 13. Hereinafter, when the relation diagram 10a and the relation diagram 10b to be described below are collectively referred to as "relation diagram 10".

Next, each of the sections 20 to 22 of the control unit 2 will be described.

The creation section 20 creates the relation diagram 10 from information input by the input unit 4 being operated, and stores the relation diagram 10 in the storage unit 3 as the relation diagram information 31.

The setting section 21 sets an attribute to the box 11 and the connector 12 constituting the relation diagram 10 based on the information input by the input unit 4 being operated. The attribute is recorded in the attribute table 32. The attribute is not limited to the event name, the type, and the level number, and may include a creation date and time, an update date and time, a creator, a strength of a causal relationship, and the like. Further, in a case where the user designates a starting event from candidates of the starting event, the setting section 21 adds a point ID to the starting event and registers the point ID in the attribute table 32.

The display control section 22 generates the relation diagram 10 based on the relation diagram information 31 and displays a relation diagram display screen 5a including the relation diagram 10 on the display unit 5. In addition, the display control section 22 also displays the point ID corresponding to the starting event on the relation diagram display screen 5a. In a case where folding is instructed to the selected point ID, the display control section 22 refers to the relation diagram information 31 and the attribute table 32, and displays the relation diagram 10 obtained by folding the boxes 11 and the connectors 12 on the downstream side from the box 11 corresponding to the selected point ID. Further, the display control section 22 selects a point ID on the relation diagram 10 in a folded state, and expands the relation diagram 10 in a state before the folding in a case where expansion is instructed.

Operation of Information Processing Apparatus

Next, an example of an operation of the information processing apparatus 1 will be described with reference to FIGS. 4 to 8.

In a case where the user operates the input unit 4 to request display of the relation diagram 10, the display control section 22 generates the relation diagram 10 based on the relation diagram information 31 and displays the relation diagram display screen 5a including the relation diagram 10 on the display unit 5.

Figure 4:
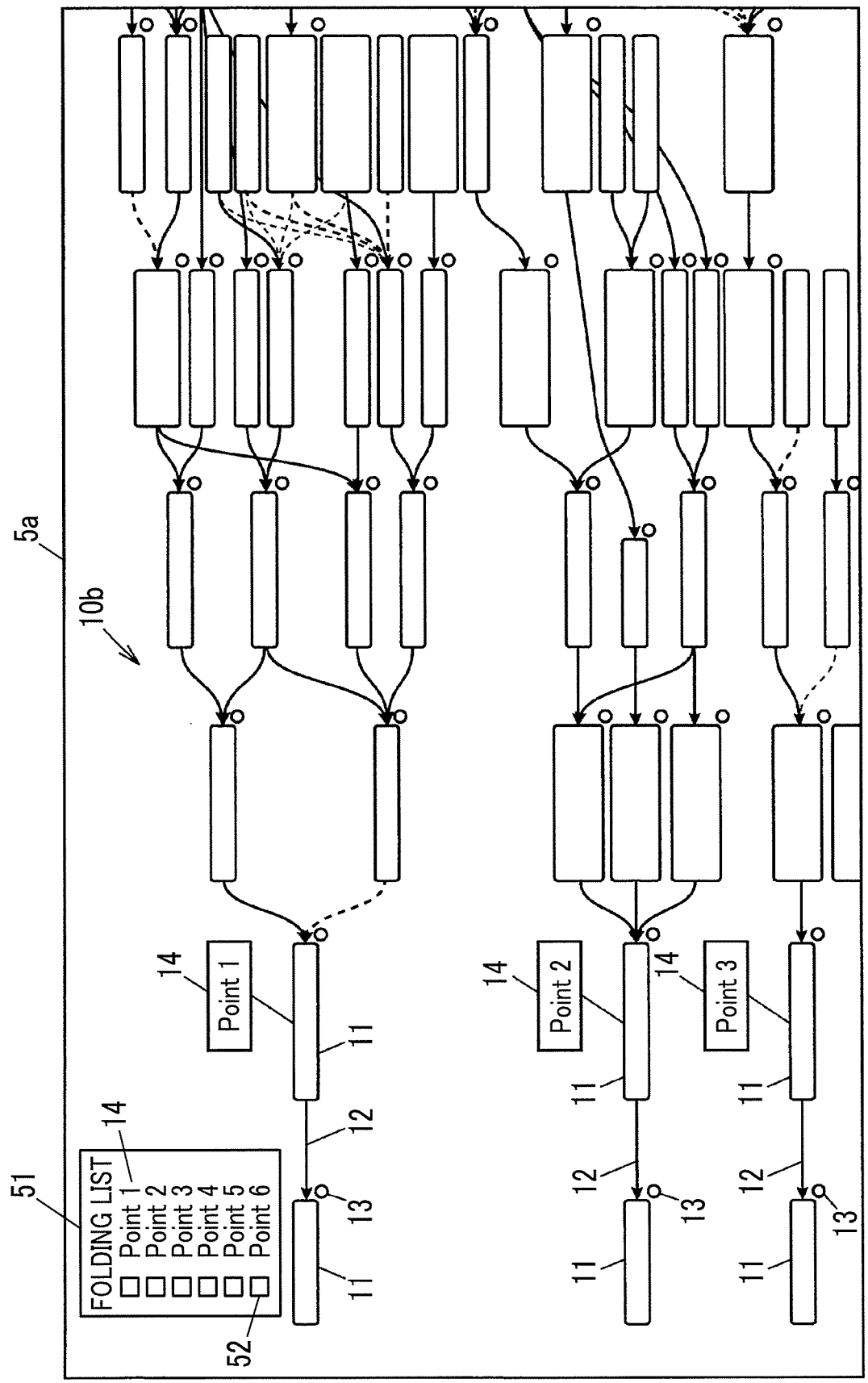
FIG. 4 is a diagram illustrating an example of a relation diagram display screen.

FIG. 4 is a diagram illustrating an example of the relation diagram display screen 5a. The relation diagram display screen 5a has the relation diagram 10b and a folding list 51. Event names in the frames of the boxes 11 are not illustrated in FIG. 4 and the relation diagram 10b to be described below. Six point IDs 14 are assigned to starting events in the relation diagram 10b. The folding list 51 has the point IDs (for example, Point 1, Point 2, . . . ) 14 and check boxes 52. The folding button 13 is provided in the vicinity of the box 11 which is a candidate of a starting event of folding. The check box 52 and the folding button 13 are examples of first identification information indicating whether the relation diagram is in a folded state or an expanded state.

In FIG. 4, Point 1 to Point 3 are displayed, and other Point 4 to Point 6 are also displayed by scrolling or enlarging and displaying the relation diagram display screen 5a.

In a case where the user checks one of the check boxes 52 to select the point ID 14, the display control section 22 refers to the relation diagram information 31 and the attribute table 32 and sets the relation diagram 10b in a folded state in which the boxes 11 and the connectors 12 on the downstream side of the box 11 corresponding to the selected point ID 14 are folded. At this time, the display control section 22 changes a color of the folding button 13 corresponding to the selected point ID 14 from white to red.

In a case where the check box 52 is unchecked, the display control section 22 expands the relation diagram 10 in the folded state, returns the relation diagram 10 to the state before folding, and returns the color of the folding button 13 from red to white. The folding button 13 is for displaying a color indicating whether the relation diagram 10 is in a folded state or an expanded state, and the folding button 13 may be operated to instruct folding or expanding.

Figure 5:
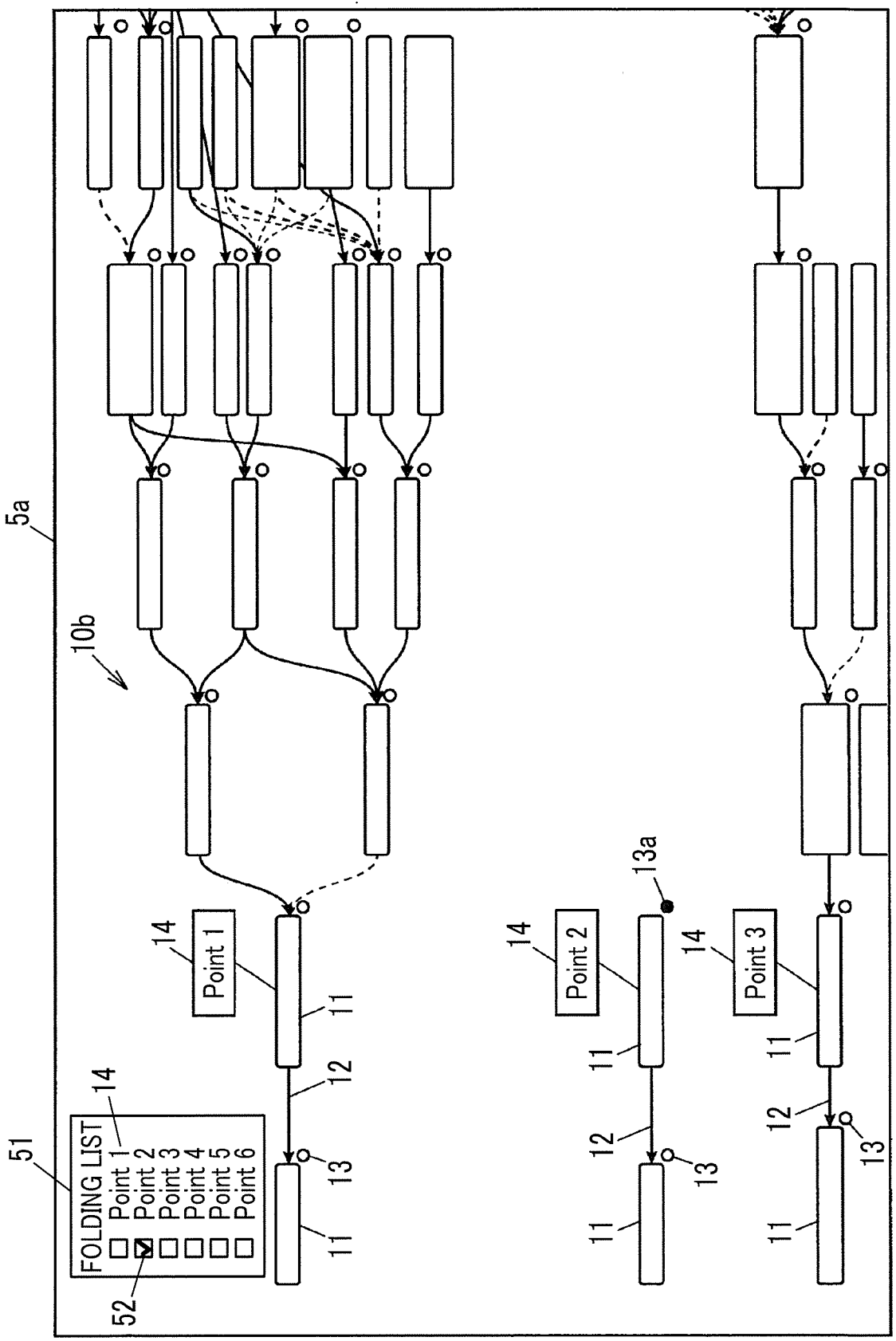
FIG. 5 is a diagram illustrating an example of a relation diagram display screen in a partially folded state.

FIG. 5 illustrates a state in which events downstream from a starting event of Point 2 are folded. In a case where the user checks the check box 52 in the folding list 51 to select Point 2 of the point ID 14, the display control section 22 refers to the relation diagram information 31 and the attribute table 32 and sets the relation diagram 10b displayed on the display unit 5 in a state in which the boxes 11 and the connectors 12 on the downstream side than the box 11 of Point 2 are folded as illustrated in FIG. 5. Further, the display control section 22 changes a color of the folding button 13a corresponding to Point 2 from white to red.

In a case where the check box 52 of Point 2 in the folding list 51 is unchecked, as illustrated in FIG. 4, the display control section 22 expands the relation diagram 10b in the folded state, and returns the color of the folding button 13a corresponding to Point 2 from red to white.

Second Exemplary Embodiment

Figure 6:
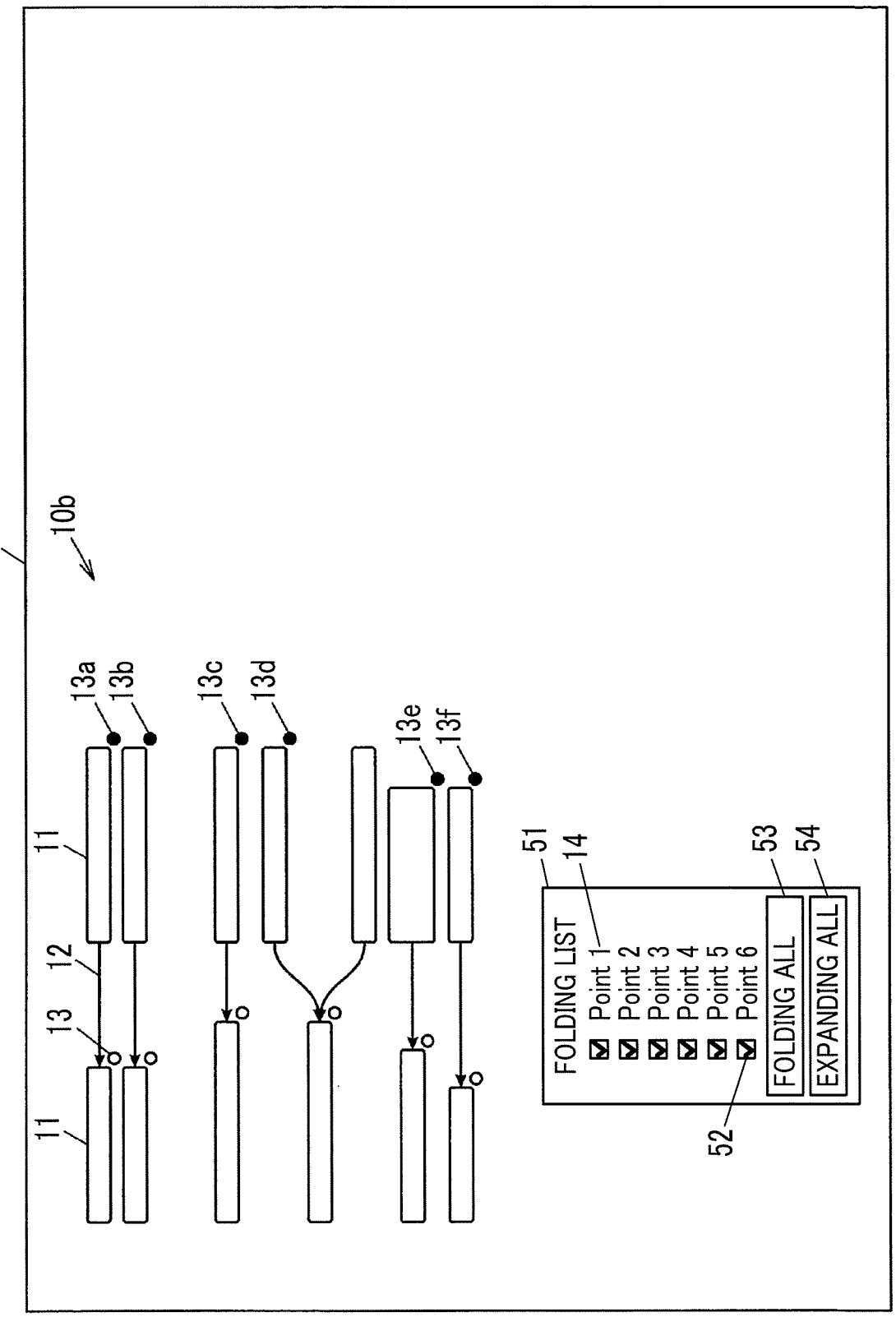
FIG. 6 is a diagram illustrating an example of a relation diagram display screen according to a second exemplary embodiment of the invention.

FIG. 6 is a diagram illustrating an example of a relation diagram display screen according to a second exemplary embodiment of the invention. The folding list 51 illustrated in FIG. 4 is obtained by adding a button 53 of "fold all" and an button 54 of "expand all" to the folding list 51 illustrated in FIG. 4. In FIG. 6, the point ID 14 is not displayed in the relation diagram 10b, but may be displayed.

In the first exemplary embodiment, in a case where a starting event of folding is selected, the starting event is individually selected. Meanwhile, in the present exemplary embodiment, a plurality of starting events can be collectively folded and expanded. Hereinafter, the points different from the first exemplary embodiment will be generally described.

In a case where an operation indicating folding all is performed, the display control section 22 displays the relation diagram 10 by folding all of starting events as starting points, and expands the relation diagram 10 into the state before folding in a case where the operation indicating expanding all is performed on the relation diagram 10 in the folded state.

In a case where the button 53 of "fold all" is operated on the relation diagram 10b in the unfolded state, the display control section 22 sets a state in which all the check boxes 52 in the folding list 51 are selected as illustrated in FIG. 6. Further, the display control section 22 sets the relation diagram 10b displayed on the display unit 5 in a state in which the boxes 11 and the connectors 12 on the downstream side of the respective boxes 11 of all Point 1 to Point 6 are folded. At this time, the display control section 22 changes colors of folding buttons 13a to 13f corresponding to all Point 1 to Point 6 from white to red.

In a case where the button 54 of "expand all" is operated on the relation diagram display screen 5a illustrated in FIG. 6, the display control section 22 sets the relation diagram 10b displayed on the display unit 5 in a state in which the boxes 11 and the connectors 12 on the downstream side of the respective boxes 11 of all Point 1 to Point 6 are expanded, as illustrated in FIG. 4. At this time, the display control section 22 returns the colors of folding buttons 13a to 13f corresponding to all Point 1 to Point 6 from red to white.

Third Exemplary Embodiment

Figure 7:
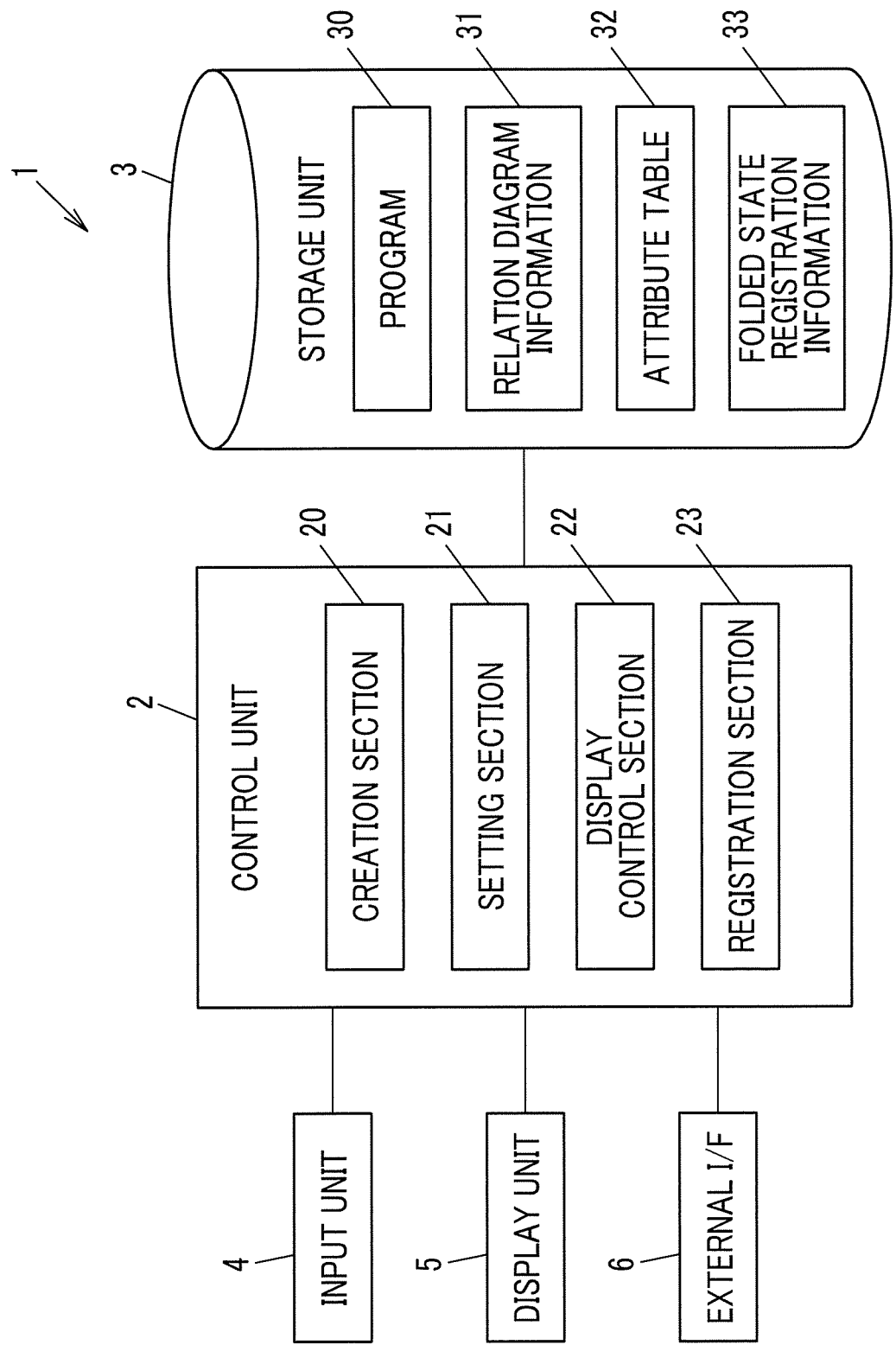
FIG. 7 is a block diagram illustrating an example of a control system of an information processing apparatus according to a third exemplary embodiment of the invention.

FIG. 7 is a block diagram illustrating an example of a control system of an information processing apparatus according to a third exemplary embodiment of the invention.

In the first exemplary embodiment, in a case where a starting event of folding is selected, the starting event is individually selected. Meanwhile, in the present exemplary embodiment, point IDs of events having the common attribute can be collectively folded and expanded, and a folded state can be further registered. Hereinafter, the points different from the first exemplary embodiment will be generally described.

The control unit 2 is configured to include a CPU, an interface, and the like in the same manner as the first exemplary embodiment, and the CPU executes the program 30 stored in the storage unit 3 to function as the creation section 20, the setting section 21, the display control section 22, or the like and to further function as a registration section 23.

In the same manner as the first exemplary embodiment, the storage unit 3 stores the program 30, the relation diagram information 31, and the attribute table 32 (see FIG. 2), and further stores folded state registration information 33 (see FIG. 8).

FIG. 8 is a diagram illustrating an example of the folded state registration information 33. The folded state registration information 33 has items such as "folding ID", "registration date and time", "user ID", "folding type", "point ID", and the like. The "folding ID" indicates a folding ID for identifying folded state information. In the "registration date and time", a registered date and time is registered. In the "user ID", a user ID instructing registration is registered. In the "folding type", one of an attribute, all, and individual is registered. In a case where the "folding type" is an attribute, an event having the attribute is a starting event. In a case where the "folding type" is all, events of all point IDs are starting events. In a case where the "folding type" is individual, an event of an individually selected point ID is the starting event. The folding ID is an example of second identification information for identifying state information which defines a folded state of the relation diagram.

In a case where the attribute is selected, the display control section 22 sets the relation diagram 10 in which events having the same attribute are folded as starting events. The display control section 22 displays the folded state registration information 33 on the display unit 5 in a case where the input unit 4 is operated to request display of the folded state registration information 33. In a case where the folding ID is selected, the display unit 5 displays the relation diagram 10b in a folded state on the display unit 5 based on the point ID corresponding to the selected folding ID in the folded state registration information 33, the relation diagram information 31, and the attribute table 32.

In a case where a registration instruction is performed on the relation diagram 10b in the folded state displayed on the display unit 5, the registration section 23 registers the point ID indicating a starting event of folding in the storage unit 3 in association with the folding ID as the folded state registration information 33.

Operation of Information Processing Apparatus

Next, an example of an operation of the information processing apparatus 1 according to the third exemplary embodiment will be described.

In a case where the user operates the input unit 4 to request display of the relation diagram 10, the display control section 22 generates the relation diagram 10 based on the relation diagram information 31 and displays the relation diagram display screen 5a including the relation diagram 10 on the display unit 5.

Figure 9:
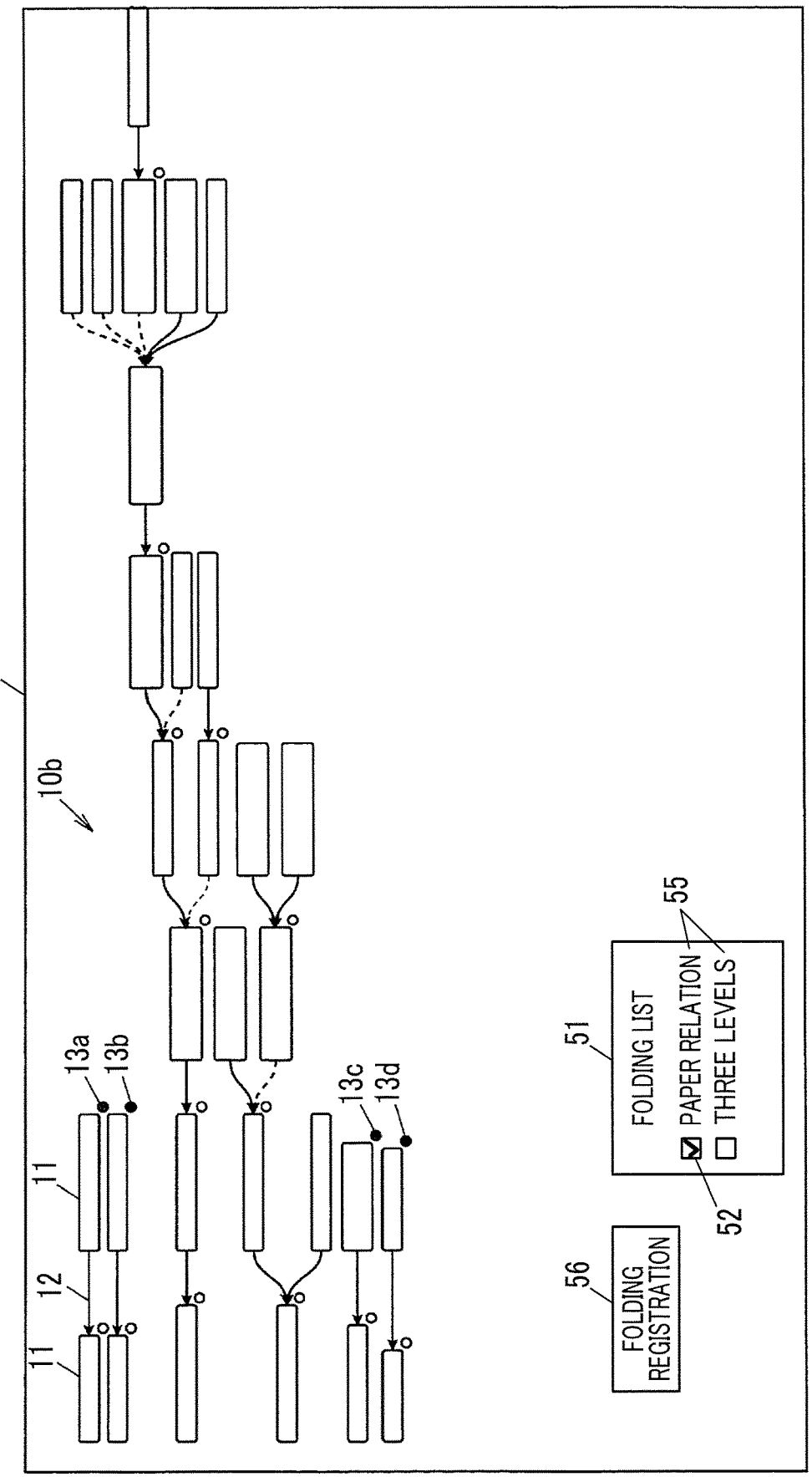
FIG. 9 is a diagram illustrating an example of a relation diagram display screen in a state of being folded with an attribute of a paper relation.

FIG. 9 is a diagram illustrating an example of the relation diagram display screen 5a. The relation diagram display screen 5a has the relation diagram 10b, the folding list 51, and a button 56 of "folding registration". In the folding list 51, by selecting a common attribute 55 with the check box 52, a starting event of folding can be set. As the attribute 55 illustrated in FIG. 9, "paper relation" and "three levels" are used. In FIG. 9, the point ID 14 is not displayed in the relation diagram 10b, but may be displayed. The attribute 55 is an example of attribute information.

In a case where the attribute 55 of "paper relation" is selected, as illustrated in FIG. 9, the display control section 22 refers to the relation diagram information 31 and the attribute table 32, and displays the relation diagram 10b in which the boxes 11 and the connectors 12 on the downstream side of the box 11 corresponding to a point ID having "paper relation" as the attribute 55 are folded on the display unit 5. At this time, the display control section 22 changes colors of the folding buttons 13a to 13d corresponding to the point ID of "paper relation" from white to red.

In a case where the button 56 of "folding registration" is operated on the relation diagram display screen 5a illustrated in FIG. 9, the registration section 23 registers state information defining a folded state, that is, a folding ID, a registration date and time, a user ID, and a folding type, and a point ID in the storage unit 3 as the folded state registration information 33.

In a case where the check box 52 of "paper relation" is unchecked on the relation diagram display screen 5a illustrated in FIG. 9, the display control section 22 returns the relation diagram 10b in the folded state into the state before the folding. At this time, the display control section 22 returns the colors of the folding buttons 13a to 13d corresponding to the point ID of "paper relation" from red to white.

Figure 10:
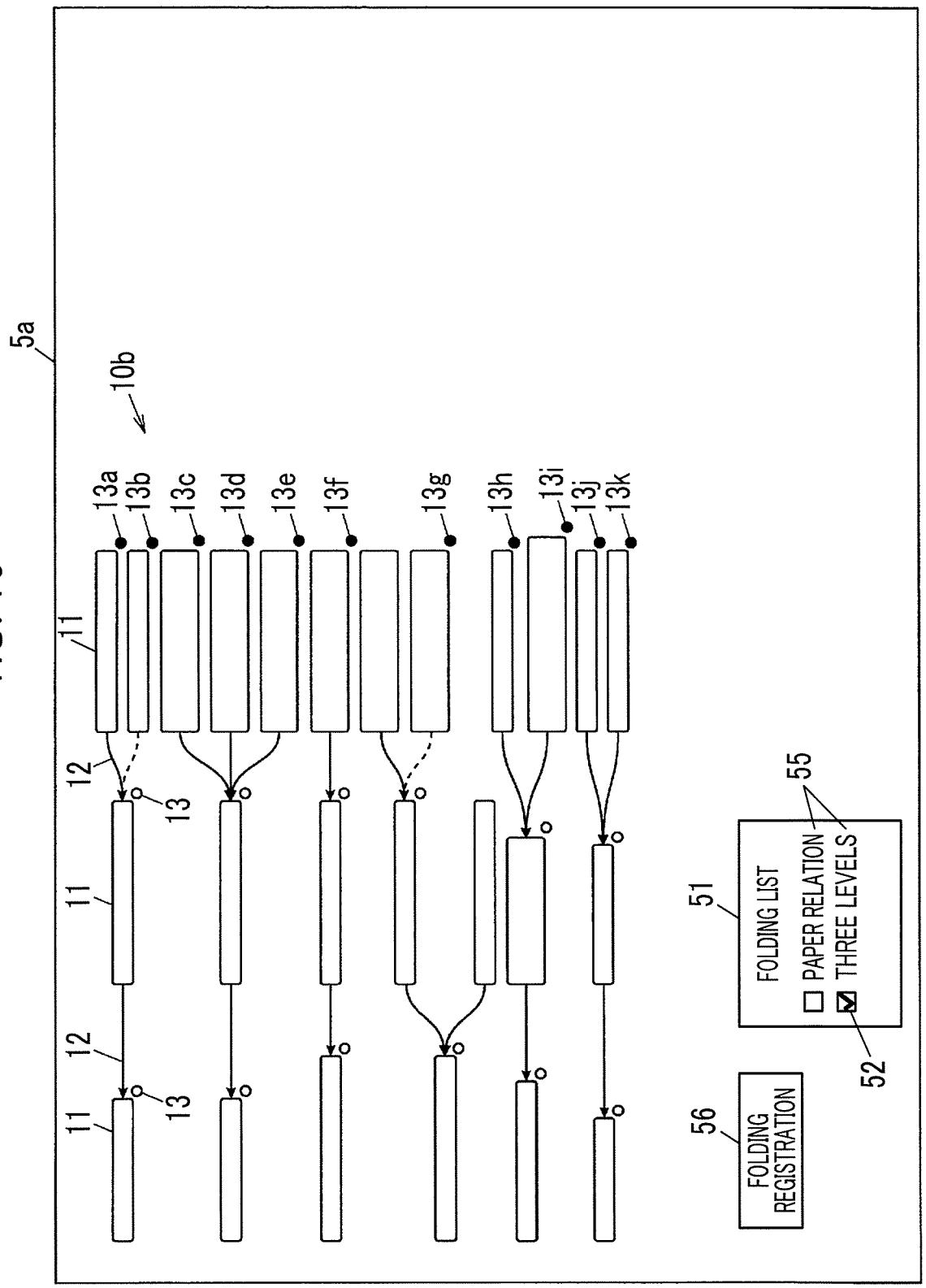
FIG. 10 is a diagram illustrating an example of a relation diagram display screen in a state of being folded with an attribute having three levels.

In a case where the attribute 55 of "three levels" is selected with the check box 52, as illustrated in FIG. 10, the display control section 22 refers to the relation diagram information 31 and the attribute table 32, and displays the relation diagram 10b in which the boxes 11 and the connectors 12 on the downstream side of the box 11 corresponding to a point ID having "three levels" (a level number is a third level in a case illustrated in FIG. 2) as the attribute 55 are folded on the display unit 5. At this time, the display control section 22 changes colors of the folding buttons 13a to 13k corresponding to the point ID of "three levels" from white to red.

In a case where the button 56 of "folding registration" is operated on the relation diagram display screen 5a illustrated in FIG. 10, the registration section 23 registers state information defining a folded state in the storage unit 3 as the folded state registration information 33. In FIG. 10, the point ID 14 is not displayed in the relation diagram 10b, but may be displayed.

In a case where the check box 52 of "three levels" is unchecked on the relation diagram display screen 5a illustrated in FIG. 10, the display control section 22 returns the relation diagram 10b in the folded state into the state before the folding. At this time, the display control section 22 returns the colors of the folding buttons 13a to 13k corresponding to the point ID of "three levels" from red to white.

Modification 1

The button 56 of "folding registration" illustrated in FIGS. 9 and 10 may be added to the folding list 51 illustrated in FIGS. 4 to 6 so that the folded state can be registered in the storage unit 3 as the folded state registration information 33.

Modification 2

The button 53 of "fold all" and the button 54 of "expand all" illustrated in FIG. 6 may be added to the folding list 51 illustrated in FIGS. 9 and 10 so that events downstream from the starting event of all point IDs can be folded or expanded.

Although the exemplary embodiments of the invention are described above, the embodiments of the exemplary embodiment of the invention are not limited to the above exemplary embodiments, and various modifications and implementations are possible without departing from the gist of the exemplary embodiment of the invention. For example, in each of the above exemplary embodiments, the causal relationship is described as a logical relationship, but the exemplary embodiment of the invention may be applied to another relationship such as an equal relationship or an opposition relationship. In each of the above exemplary embodiments, the causal relationship between a cause or a factor and a result is described as a logical relationship, but the exemplary embodiment of the invention may be applied to other causal relationships such as a reason and an assertion.

Each section of the control unit 2 may be configured by a hardware circuit such as a field programmable gate array (FPGA) of which a part or whole is reconfigurable or an application specific integrated circuit (ASIC).

Further, some components of the above-described exemplary embodiment can be omitted or changed without departing from the scope of the exemplary embodiment of the invention. In addition, steps can be added, deleted, changed, replaced, and the like in the flow of the above-described exemplary embodiment without departing from the scope of the exemplary embodiment of the invention. Further, the program used in the above exemplary embodiment can be provided by being recorded on a computer-readable recording medium such as a CD-ROM, and can be used via a network by being stored in an external server such as a cloud server.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor that
displays a relation diagram expressing logical relationships between a plurality of events from an upstream side to a downstream side,
displays, in a case where an instruction of folding is performed on a plurality of first events selected as folding starting points from the plurality of events, the relation diagram in which a plurality of second events on the downstream side of the plurality of selected first events are folded, wherein the selection of each of the first events and folding operation on the corresponding second events on the downstream side of each of the plurality of selected first events are performed based on a same instruction, and
displays, in a case where an instruction of expanding is performed on the relation diagram in a folded state, the relation diagram in which the second events on the downstream side of the plurality of selected first events are expanded into a state before the instruction of folding is performed.

2. The information processing apparatus according to claim 1,
wherein the processor displays first identification information corresponding to the plurality of selected first events, and receives an instruction of folding or expanding in accordance with the first identification information.

3. The information processing apparatus according to claim 2,
wherein the first identification information indicates whether the relation diagram is in a folded state or an expanded state.

4. The information processing apparatus according to claim 1,
wherein the processor displays the relation diagram by folding all events serving as starting points as starting points in a case where an operation of indicating folding all the events serving as the starting points is performed, and expands the relation diagram into the state before the folding in a case where an operation of indicating expanding all the events serving as the starting points is performed on the relation diagram in the folded state.

5. The information processing apparatus according to claim 2,
wherein the processor folds and displays the relation diagram by using all events serving as the plurality of starting points as starting points in a case where an operation of indicating folding all is performed, and expands the relation diagram into the state before the folding in a case where an operation of indicating expanding all is performed on the relation diagram in the folded state.

6. The information processing apparatus according to claim 3,
wherein the processor folds and displays the relation diagram by using all events serving as the plurality of starting points as starting points in a case where an operation of indicating folding all is performed, and expands the relation diagram into the state before the folding in a case where an operation of indicating expanding all is performed on the relation diagram in the folded state.

7. The information processing apparatus according to claim 1,
wherein a plurality of attributes are set to each of the plurality of events, and
the processor is configured to select the plurality of first events from the plurality of events by determining at least one of the attributes corresponding to the first events matches a predetermined criteria.

8. The information processing apparatus according to claim 2,
wherein a plurality of attributes are set to each of the plurality of events, and
the processor is configured to select the plurality of first events from the plurality of events by determining at least one of the attributes corresponding to the first events matches a predetermined criteria.

9. The information processing apparatus according to claim 3,
wherein a plurality of attributes are set to each of the plurality of events, and the processor is configured to select the plurality of first events from the plurality of events by determining at least one of the attributes corresponding to the first events matches a predetermined criteria.

10. The information processing apparatus according to claim 1,
wherein the processor is further configured to register first identification information corresponding to the plurality of selected first events in a storage unit in association with second identification information for identifying state information defining a folded state of the currently displayed relation diagram.

11. The information processing apparatus according to claim 2,
wherein the processor is further configured to register the first identification information in a storage unit in association with second identification information for identifying state information defining a folded state of the currently displayed relation diagram.

12. The information processing apparatus according to claim 3,
wherein the processor is further configured to register the first identification information in a storage unit in association with second identification information for identifying state information defining a folded state of the currently displayed relation diagram.

13. The information processing apparatus according to claim 4,
wherein the processor is further configured to register the first identification information in a storage unit in association with second identification information for identifying state information defining a folded state of the currently displayed relation diagram.

14. The information processing apparatus according to claim 5,
wherein the processor is further configured to register the first identification information in a storage unit in association with second identification information for identifying state information defining a folded state of the currently displayed relation diagram.

15. The information processing apparatus according to claim 6,
wherein the processor is further configured to register the first identification information in a storage unit in association with second identification information for identifying state information defining a folded state of the currently displayed relation diagram.

16. The information processing apparatus according to claim 7,
wherein the processor is further configured to register the first identification information in a storage unit in association with second identification information for identifying state information defining a folded state of the currently displayed relation diagram.

17. The information processing apparatus according to claim 8,
wherein the processor is further configured to register the first identification information in a storage unit in association with second identification information for identifying state information defining a folded state of the currently displayed relation diagram.

18. The information processing apparatus according to claim 9,
wherein the processor is further configured to register the first identification information in a storage unit in association with second identification information for identifying state information defining a folded state of the currently displayed relation diagram.

19. The information processing apparatus according to claim 10,
wherein the processor displays the second identification information, reads out the corresponding state information from the storage unit in a case where the second identification information is selected, and reproduces and displays the folded state.

20. A non-transitory computer readable medium storing a program causing a computer to:
display a relation diagram expressing logical relationships between a plurality of events from an upstream side to a downstream side,
display, in a case where an instruction of folding is performed on a plurality of events selected as folding starting points from the plurality of events, the relation diagram in which a plurality of second events on the downstream side of the plurality of selected first events are folded, wherein the selection of each of the first events and folding operation on the corresponding second events on the downstream side of each of the plurality of selected first events are performed based on a same instruction, and
display, in a case where an instruction of expanding is performed on the relation diagram in a folded state, the relation diagram in which the second events on the downstream side of the plurality of selected first events are expanded into a state before the instruction of folding is performed.

\* \* \* \* \*